United States Patent [19]
Landau

[11] 4,188,444
[45] Feb. 12, 1980

[54] METHOD OF COATING GLASS AND GLASS COATED THEREBY

[75] Inventor: Manfred Landau, Southport, England

[73] Assignee: Pilkington Brothers Limited, St. Helens, England

[21] Appl. No.: 880,430

[22] Filed: Feb. 23, 1978

[30] Foreign Application Priority Data

Mar. 1, 1977 [GB] United Kingdom ............... 8641/77

[51] Int. Cl.² ............................................. C03C 17/30
[52] U.S. Cl. ..................................... 428/428; 65/60 B; 427/248 B; 427/248 H; 428/429
[58] Field of Search ............. 65/42, 60 A, 60 B, 60 C, 65/60 D; 427/248 B, 248 H; 428/428

[56] References Cited

U.S. PATENT DOCUMENTS

| 2,439,689 | 4/1948 | Hyde | 427/248 H X |
| 3,984,608 | 10/1976 | Opitz | 65/60 A |
| 4,019,887 | 4/1977 | Kirkbride et al. | 65/60 C |

Primary Examiner—Arthur D. Kellogg
Attorney, Agent, or Firm—Burns, Doane, Swecker & Mathis

[57] ABSTRACT

Glass is coated with an alkali-resistant silicon coating by moving the glass past a coating station while the glass is at least at 400° C. Silane-containing gas is released close to the glass surface, which gas includes a proportion of a gaseous electron-donating compound which imparts a predetermined alkali-resistance to the coating produced when silane in the gas pyrolyzes at the glass surface.

19 Claims, No Drawings

METHOD OF COATING GLASS AND GLASS COATED THEREBY

BACKGROUND OF THE INVENTION

This invention relates to a method of coating glass with a silicon-containing coating, and to silicon-coated glass so produced, and is an improvement in the method and product of our U.S. Pat. No. 4,019,887.

In U.S. Pat. No. 4,019,887 there is described and claimed a method comprising moving the glass past a coating station while the temperature of the glass is at least 400° C. supplying silane-containing gas to the coating station; releasing the gas close to the hot glass surface at a substantially constant pressure across the glass surface into a hot zone in which the gas is heated, which zone opens towards and extends across the glass surface so that the silane pyrolyses depositing a silicon-containing coating on the glass surface, and maintaining non-oxidising conditions in said hot zone. The glass so produced has a substantially uniform silicon coating and has good solar control properties and a pleasing appearance.

It has now been found that by adding an electron-donating compound to the silane-containing gas which is released close to a hot glass surface, the alkali-resistance of the silicon coating on the glass is improved.

It is known from the paper "Reactions of Silane with Unsaturated Hydrocarbons" by David G. White and Eugene G. Rochow, Journal of the American Chemical Society Vo. 76, pages 3887 to 3902, that during the production of alkylsilanes by the reaction in a heated tube over a three hour period of a silane with ethylene or acetylene, a thin layer of silicon was deposited on the inner surface of the heated tube through which the gaseous reactants were being circulated.

It is a main object of the present invention to employ the discovery that the presence of an electron-donating compound imparts alkali-resistance to a silicon coating on glass.

SUMMARY

The invention provides a method of coating glass with a silicon-containing coating, in which the glass is moved past a coating station while the temperature of the glass is at least 400° C. Silane-containing gas is released close to the glass surface at a substantially constant pressure across the glass surface and under non-oxidising conditions so that the silane pyrolyses to deposit a silicon-containing coating on the glass surface. For imparting a predetermined alkali resistance to the silicon-containing coating, the silane-containing gas includes a proportion of a gaseous electron-donating compound which imparts said alkali resistance.

The alkali-resistance of the silicon coating is determined in a manner to be described,, by ascertaining the time the silicon coating withstands attack by a strong alkaline solution without visual damage.

The process of the invention is useful for the treatment of many commercially produced glasses in different forms which can be moved past a coating station, for example, window glass, optical glass and glass fibres. Such glasses, generally contain oxides of at least two elements and are usually lead-silicate glasses, alkali metal silicate glasses and alkaline earth metal silicate glasses, especially soda-lime-silica glasses. In some cases, depending on the alkali resistance of the glass and the proportion of the electron-donating compound used, the alkali resistance of the coated surface produced by the method of the present invention may be greater than that of the glass substrate.

Electron-donating compounds which are used to impart alkali-resistance to the silicon coating contain in their electronic structure, either in bonds or as lone pair electrons, electrons which can be donated into the electronic structure of suitable acceptor molecules or atoms. The electron-donating compound may be an olefin.

Preferably the silane-containing gas comprises nitrogen as carrier gas and up to 6% by volume of a gaseous electron-donating compound.

Particularly suitable electron-donating compounds are olefins, especially ethylene.

The silane-containing gas may comprise monosilane in nitrogen as carrier gas and up to 6% by volume of a gaseous olefin.

The ratio of electron-donating compound to silane in the gas may be in the range 0.1 to 2.0. Preferably the ratio is in the range 0.2 to 0.5. Proportions outside these ranges may be advantageous in some circumstances.

Further according to the invention the silane-contaning gas may comprise 1% to 7% by volume of monosilane, 0.5% to 6% by volume of ethylene, and optionally a proportion of hydrogen, the remainder being nitrogen.

The invention also comprehends a method wherein the silane-containing gas comprises 0.3% to 7% by volume of monosilane, 0.2% to 6% by volume of gaseous electron-donating compound, and optionally a proportion of hydrogen, the remainder being nitrogen.

When hydrogen is present, the silane-containing gas may comprise up to 10% by volume of hydrogen. A larger proportion of hydrogen may be used.

The electron-donating compound may be an acetylenic hydrocarbon, for example acetylene. Further the electron-donating compound may be an aromatic hydrocarbon, for example benzene, toluene or xylene.

The electron-donating compound may be ammonia.

The invention also comprehends glass coated with a reflecting silicon coating, characterised in that the coating has a refractive index in the range 2.5 to 3.5, and an alkali-resistance such that the coating shows no sign of damage to the unaided eye after immersion in 1 Normal sodium hydroxide at 90° C. for at least 60 seconds.

Preferably the coating shows no sign of damage for at least 5 minutes.

Preferably the coating is such that 30% of the light from a C.I.E. Illuminant C source incident on the coated side of the glass is reflected.

The refractive index of the coating may be in the range 2.8 to 3.4. The glass may be soda-lime-silica glass.

DESCRIPTION OF THE PREFERRED EMBODIMENTS

Some examples of coating glass, for example flat glass of soda-lime-silica composition, with a silicon-containing coating, will now be described.

The glass substrate to be coated with a silicon-containing coating is a standard commercial tinted, solar control soda-lime-silica glass, containing small quantities of selenium and cobalt oxide as colouring constituents, of the kind produced in ribbon form on a bath of molten metal.

The glass is coated while it is at a temperature of at least 400° C. and is being advanced past a coating station in the manner described in the above-mentioned U.S. Pat. No. 4,019,887 the disclosure of which is incorporated herein by reference.

When the glass being coated as it is produced on a bath of molten metal, the coating may be applied within and near to the outlet end of the tank structure containing the bath of molten metal along which the glass is advancing in ribbon form. In the region of the outlet end of the bath where coating takes place the temperature of the glass is in the range 600° C. to 650° C.

Alternatively the coating may be applied to a ribbon of glass as it advances through an annealing lehr, the gas distributor being located in the lehr where the glass temperature is in the range 400° C. to 750° C. The glass being coated may be glass produced by a rolling process or by a vertical drawing process. The invention is especially applicable to the coating of flat glass, including wired glass, in sheet or ribbon form, moulded glass articles and glass fibres.

In order to achieve an acceptable rate of silane decomposition, the glass should be at a temperature of at least 400° C. and in the range 400° C. to 850° C., preferably in the range 500° C. to 850° C. To avoid undesirable side reactions, for example reactions resulting in the formation of silicon carbide, it is desirable to avoid glass temperatures above 850° C. In some cases, a lower maximum temperature limit may be set by the softness of the glass surface.

In order to illustrate the invention experiments were carried out by coating flat, tinted, solar-control, soda-lime-silica glass, using different proportions of ethylene ($C_2H_4$) in a silane-containing gas consisting of 5% by volume monosilane ($SiH_4$) in nitrogen as carrier gas. The results obtained are shown in Tables I and II.

The refractive index of the glass is known so that the refractive index of the coating can be determined using a standard light source. The coating thickness can be determined from optical thickness measurements in known manner.

All the optical measurements referred to in the specification were made in known manner with the coated surface of the glass towards the light source which was a C.I.E. illuminant C source.

Table I shows that the silicon-coating produced on the glass of Samples 2 to 12 with a proportion of ethylene in the gas had an improved alkali-resistance as compared with the coated glass of Sample 1, the control sample, produced without the addition of ethylene to the silane-containing gas. Small variations in the proportion of ethylene present appear to produce only small changes in the optical characteristics imparted to the glass by the silicon-containing coating.

The results shows that with a small ratio of ethylene to monosilane as in Samples 2, 3 and 4 there is no substantial change in the optical characteristics but a surprising increase in the resistance of the silicon-containing coating to alkali attack, in that visual evidence of attack did not appear until the glass had been in contact with the 1 Normal sodium hydroxide for at least 1 hour.

The optical properties of silicon-containing coatings of Samples 1, 2, 4, 5, 10 and 12 were measured. In making the measurements there was compensation for the tint of the glass substrate by companing coated and uncoated samples of the tinted glass substrate. In effect the tinted substrate was replaced by 6 mm thick clear flat glass. The results, which are shown in Table II are the optical properties of samples of 6 mm clear soda-lime-silica glass produced on a molten metal bath and carrying equivalent coatings to those produced on a tinted glass substrate as described with reference to Table I.

TABLE I

| SAMPLE | GAS FLOW (Liter/min) | | GAS % by Volume | | | $C_2H_4:SiH_4$ RATIO | R max (%) | λR max (nm) | Refractive Index | Coating Thickness (nm) | Alkali Resistance |
|---|---|---|---|---|---|---|---|---|---|---|---|
| | $C_2H_4$ | 5% $SiH_4/N_2$ | $C_2H_4$ | $SiH_4$ | $N_2$ | | | | | | |
| 1 | 0 | 45 | 0 | 5 | 95 | 0 | 58.7 | 430 | 3.35 | 32.1 | 18 s |
| 2 | 0.5 | 45 | 1.1 | 5 | 93.9 | 0.22:1 | 45.8 | 425 | 2.80 | 37.9 | 1h 5 min |
| 3 | 0.5 | 55 | 0.9 | 5 | 94.1 | 0.18:1 | 52.9 | 450 | 3.10 | 36.3 | 1h |
| 4 | 0.5 | 60 | 0.8 | 5 | 94.2 | 0.17:1 | 54.3 | 475 | 3.15 | 37.7 | 1h |
| 5 | 1 | 45 | 2.2 | 4.9 | 92.9 | 0.44:1 | 44.6 | 475 | 2.75 | 43.2 | 2h 20 min |
| 6 | 1 | 55 | 1.8 | 4.9 | 93.3 | 0.36:1 | 51.0 | 455 | 3.00 | 37.9 | 1h 30 min |
| 7 | 1 | 60 | 1.6 | 4.9 | 93.5 | 0.33:1 | 52.4 | 470 | 3.05 | 38.5 | 2h 45 min |
| 8 | 1.75 | 45 | 3.7 | 4.8 | 91.5 | 0.78:1 | 37.2 | 405 | 2.50 | 40.5 | 3h |
| 9 | 2 | 55 | 3.5 | 4.8 | 91.7 | 0.73:1 | 40.1 | 420 | 2.60 | 40.4 | 3h |
| 10 | 2 | 60 | 3.2 | 4.8 | 92 | 0.67:1 | 42.3 | 415 | 2.65 | 39.2 | 3h 30 min |
| 11 | 3.3 | 55 | 5.7 | 4.7 | 89.7 | 1.20:1 | 35.3 | 405 | 2.45 | 41.3 | 5h 50 min |
| 12 | 3.3 | 60 | 5.2 | 4.7 | 90.1 | 1.10:1 | 35.7 | 405 | 2.45 | 41.3 | 7h 20 min |

In the above table:
R max is the maximum light reflection expressed as a percentage of the incident light;
λR max is the wavelength at which light reflection from the coating is a maximum;

TABLE II

| COATING OF SAMPLE NO. | $C_2H_4:SiH_4$ RATIO | LIGHT TRANSMISSION % | LIGHT REFLECTION % | DIRECT SOLAR HEAT TRANSMISSION % | SOLAR HEAT REFLECTION % | SOLAR HEAT ABSORPTION % | TOTAL SOLAR HEAT TRANSMISSION % |
|---|---|---|---|---|---|---|---|
| 1 | 0 | 31 | 54 | 43 | 38 | 19 | 49 |
| 2 | 0.22 | 43 | 41 | 51 | 28 | 21 | 58 |
| 4 | 0.17 | 32 | 52 | 43 | 37 | 20 | 49 |
| 5 | 0.44 | 41 | 43 | 49 | 30 | 21 | 56 |
| 10 | 0.67 | 47 | 36 | 53 | 25 | 22 | 60 |

TABLE II-continued

| COATING OF SAMPLE NO. | $C_2H_4:SiH_4$ RATIO | LIGHT TRANSMIS- SION % | LIGHT REFLEC- TION % | DIRECT SOLAR HEAT TRANSMISSION % | SOLAR HEAT REFLEC- TION % | SOLAR HEAT ABSORP- TION % | TOTAL SOLAR HEAT TRANSMISSION % |
|---|---|---|---|---|---|---|---|
| 12 | 1.10 | 57 | 29 | 59 | 20 | 21 | 66 |

When the ratio of ethylene to silane in the gas is less than 0.1 there is no major change in the properties of the coated glass as compared with Sample 1 produced without any ethylene in the silane-containing gas.

As the amount of ethylene is increased there is a steady increase in the alkali-resistance as measured by the time before visual attack appears up to a time of at least 5 h 50 m when the ethylene to silane ratio is 1.2:1.

Increasing the proportion of ethylene to silane generally led to a reduction in the refractive index of the silicon coating and a consequent change in the optical properties of the coated glass. By controlling the flow of ethylene relative to the flow of silane in nitrogen, it was possible to achieve predetermined optical properties, especially a high reflectivity, whilst obtaining the benefit of high alkali resistance provided by the presence of ethylene in the silane-containing gas.

In weathering tests in which the coated glass was exposed to a humid atmosphere the silicon-containing coating of Sample 1, the control sample, survived for about 10 days. There was no visible change in the silicon coating of Samples 2 to 12 after a 6 week test period. The test was carried out on packs of 5 coated sheets, each 300 mm square separated by particulate interleaving material and placed in a weathering cabinet in which the temperature was maintained at 60° C. and the relative humidity at 95% to 100%.

Silicon-containing coatings produced by the process of the invention using ethylene have been examined and compared with silicon coatings produced in the absence of an electron-donating compound. The most notable feature is an apparent rise in the oxygen content of the coating, that is a fall in the silicon:oxygen ratio, resulting from the use of an electron-donating compound. At least some of the oxygen in the coating produced in accordance with the invention is believed to be present in a different form from any oxygen present in coatings made in the absence of an electron-donating compound. This oxygen is apparently responsible for a change in the peak positions and intensities of the silicon electrons as observed by ESCA (Electron Spectroscopy for Chemical Analysis). For example, when using a high proportion of ethylene, the principal silicon (2p) peak is clearly observed at 1020 eV compared with peaks at 103.3 eV and 99.4 eV attributed to silicon metal and oxidised silicon respectively (see C. D. Wagner, Faraday Discussions of the Chemical Society 60, 1975, 296).

The alkali resistance of the coating appears to be associated with the high proportion of oxygen in the coating which, like the alkali resistance, appears to increase with increase in the ratio of electron-donating compound to silane in the gas.

Analysis showed that ions such as sodium, calcium and magnesium may be present in the coating and their distributions within the glass surface and the coating depend on the ethylene:silane ratio, and changes in the distributions reflect changes in the distribution and state of oxygen in the coating.

As the ethylene content of the silane-containing gas increased, the refractive index of the coating was progressively reduced. Consequently there was a progressive decrease in both the light reflection and the solar heat reflection. This was not accompanied by any significant increase in optical absorption by the silicon coatings so that any reduction in reflection was matched by an increase in the transmission of light and solar heat. The change in refractive index took place without any substantial change in the thickness of the coating as illustrated by Table I.

In another series of experiments clear soda-lime-silica glass was produced on a bath of molten metal and was coated with a silicon-containing coating by the method of the invention, which coating proved to be surprisingly resistant to alkali attack.

The glass was coated near the outlet end of the tank structure containing the molten metal bath, where the glass temperature was in the range 600° C. to 650° C. The results obtained are shown in Tables III and IV.

TABLE III

| SAMPLE | Total Gas Flow (Liter/min) | GAS % by volume | | | | $C_2H_4:SiH_4$ Ratio | λR max (nm) | Refra- ctive index | Coa- ting thick- ness (nm) | Alkali Resis- tance |
| | | $C_2H_4$ | $SiH_4$ | $N_2$ | $H_2$ | | | | | |
|---|---|---|---|---|---|---|---|---|---|---|
| 15 | 140 | 0 | 4.6 | 92 | 3.4 | 0 | 400 | 3.36 | 30.0 | 18 s |
| 16 | 180 | 0.6 | 5.2 | 91.6 | 2.6 | 0.11 | 455 | 3.18 | 35.8 | 45 s |
| 17 | 180 | 1.1 | 6.0 | 91.5 | 1.4 | 0.18 | 460 | 3.29 | 35.0 | 5 min |
| 18 | 180 | 1.1 | 5.4 | 91.4 | 2.1 | 0.20 | — | — | — | 5 min 30 s |
| 19 | 180 | 2 | 6.9 | 91.1 | 0 | 0.29 | 480 | 3.23 | 37.2 | 30 min |

Some optical properties of these samples are set out in Table IV.

TABLE IV

| Sample | Light Reflection % | Light Transmission % |
|---|---|---|
| 15 | 51.5 | 32.0 |
| 16 | 51.8 | 29.1 |
| 17 | 54.3 | 27.2 |
| 18 | — | — |
| 19 | 54.9 | 27.0 |

Blank spaces in Tables III and IV indicate that the values were not measured during the experiments.

It was found, surprisingly, that when using ethylene to improve the alkali resistance of silicon coatings produced on flat glass supported on a bath of molten metal, the ethylene gas had the effect of alleviating the apparent discontinuities in the coating resulting from deposit of small metal-containing particles on the glass surface.

Similar experiments were carried out with rolled plate glass of soda-lime-silica composition at a temperature of 600° C. and the results, as indicated in Table V indicate a similar durability of the silicon coating when subjected to the alkali resistance test by contact with 1 Normal NaOH at 90° C. The flow rates of ethylene and silane in its carrier gas were adjusted to produce predetermined optical properties by varying the ethylene:silane ratio thereby determining the refractive index of the coating.

TABLE V

| Sample | $C_2H_4$:$SiH_4$ Ratio | Refractive Index | Coating Thickness (nm) | Light Transmission % | Light Reflection % | Alkali Resistance |
|---|---|---|---|---|---|---|
| 20 | 0 | 3.15 | 32.5 | 31.9 | 48.1 | 18 s |
| 21 | 0.33 | 3.09 | 33.2 | 31.2 | 47.0 | 7 min |
| 22 | 0.36 | 3.07 | 34.6 | 30.0 | 47.9 | 20 min |
| 23 | 0.45 | 2.78 | 36.4 | 40.8 | 38.7 | 50 min |

Other silanes which decompose on hot glass may be used in carrying out the invention for example higher silanes such as disilane or trisilane, or substituted silanes such as chlorosilanes which are generally used in the presence of hydrogen.

These results show that it is preferable that when ethylene is used as the electron-donating compound, the ratio of ethylene to silane in the gas is in the range 0.1 to 2.0. More particularly the ratio of ethylene to silane in the gas is in the range 0.2 to 0.5.

The preferred gas composition employed in these experiments was shown to be a silicon-containing gas comprising 1% to 7% by volume of monosilane ($SiH_4$), 0.5% to 6% by volume of ethylene ($C_2H_4$), and optionally hydrogen ($H_2$) the remainder being nitrogen ($N_2$).

The refractive index of the reflecting, alakli-resistant coatings produced was found to be in the range 2.5 to 3.5, more particularly 3.1±0.3.

Other electron-donating compounds were used as a constituent of the silicon-containing gas. Other olefins which may be used are butadiene ($C_4H_6$) and pentene ($C_5H_{10}$).

The electron-donating compound may be an acetylenic hydrocarbon. Acetylene was used as a constituent of the gas. Further an aromatic hydrocarbon may be used as the electron-donating constituent of the gas, for example benzene ($C_6H_6$), toluene ($C_6H_5.CH_3$), or xylene ($C_6H_4.(CH_3)_2$).

Other additives to the silane-containing gas which have been found to be effective as an electron-donor which imparts alkali-resistance to the coating are olefinic derivatives for example difluoroethylene ($C_2H_2F_2$), and ammonia ($NH_3$).

Some examples of the use of these other electron-donating compounds are set out in Table VI. All the coatings produced had alkali-resistance comparable with those produced as described above with ethylene as the electron-donor.

TABLE VI

| Electron Donor | Temp °C. | Gas % by volume | | | | Donor: $SiH_4$ Ratio |
|---|---|---|---|---|---|---|
| | | Donor | $SiH_4$ | $N_2$ | $H_2$ | |
| acetylene $C_2H_2$ | 605 | 0.4 | 0.33 | 90.27 | 9 | 1.2:1 |
| butadiene $C_4H_6$ | 580 | 0.24 | 0.32 | 90.44 | 9 | 0.75:1 |
| ammonia $NH_3$ | 680 | 1.3 | 0.3 | 89.4 | 9 | 4.5:1 |
| ammonia $NH_3$ | 620 | 0.7 | 0.63 | 89.67 | 9 | 1.1:1 |
| difluoroethylene $C_2H_2F_2$ | 605 | 0.55 | 0.63 | 89.82 | 9 | 0.85:1 |
| benzene $C_6H_6$ | 612 | 0.32 | 0.64 | 90.04 | 9 | 0.5:1 |

It is most convenient to use a compound that is gaseous at room temperature so that it is preferred to use an olefinic or acetylenic compound containing 2 to 5 carbon atoms, although compounds containing more than 5 carbon atoms may be used provided they are gaseous below the decomposition temperature of the silane.

The invention is also applicable to the coating of any alkali metal silicate glass or alkaline earth metal silicate glass.

In a further experiment a borosilicate glass substrate was heated to 600° C. and a gasoues mixture containing 1% by volume monosilane, 1.25% by volume ethylene, 10% by volume hydrogen and 87.75% by volume nitrogen was passed onto the glass surface. A reflecting silicon coating was obtained which, on immersing for over three hours in 1 Normal sodium hydroxide at 90° C. showed no visible sign of attack.

It has also been found that use of a ratio of ethylene to silane greater than 2.5, for example a ratio of 5, results in the formation on glass of an alkali-resistant silicon coating with very good abrasion resistance. Such coatings do not have the high reflectivity to visible light as do the samples described above, and may even appear transparent to visible light.

What I claim is:

1. In a method of coating glass with a silicon-containing coating, comprising moving the glass past a coating station while the temperature of the glass is at least 400° C., and releasing silane-containing gas close to the glass surface at a substantially constant pressure across the glass surface and under non-oxidising conditions so that the silane pyrolyses to deposit a silicon-containing coating on the glass surface, the improvement comprising including in the silane-containing gas a proportion of a gaseous electron-donating compound selected from the group consisting of olefin compounds, acetylenic hydrocarbons, aromatic hydrocarbons and ammonia, said compound imparting a predetermined alkali resistance to the silicon-containing coating.

2. A method according to claim 1, wherein the silane-containing gas comprises nitrogen as carrier gas and up to 6% by volume of a gaseous electron-donating compound.

3. A method according to claim 1, wherein the silane-containing gas comprises monosilane in nitrogen as carrier gas and up to 6% by volume of a gaseous olefin.

4. A method according to claim 3, wherein the olefin is ethylene.

5. A method according to claim 4, wherein the olefin is ethylene and the ratio of ethylene to silane in the gas is in the range 0.1 to 2.0.

6. A method according to claim 5, wherein the ratio of ethylene to silane in the gas is in the range 0.2 to 0.5.

7. A method according to claim 4, wherein the silane-containing gas comprises 1% to 7% by volume of monosilane, 0.5% to 6% by volume of ethylene, and optionally a proportion of hydrogen, the remainder being nitrogen.

8. A method according to claim 7, wherein the silane-containing gas comprises up to 10% hydrogen.

9. A method according to claim 2, wherein the silane-containing gas comprises 0.3% to 7% by volume of monosilane, 0.2% to 6% by volume of gaseous electron-donating compound, and optionally a proportion of hydrogen, the remainder being nitrogen.

10. A method according to claim 9, wherein the silane-containing gas comprises up to 10% hydrogen.

11. A method according to claim 9, wherein the electron-donating compound is an acetylenic hydrocarbon.

12. A method according to claim 11, wherein the acetylenic hydrocarbon is acetylene.

13. A method according to claim 9, wherein the electron-donating compound is an aromatic hydrocarbon.

14. A method according to claim 13, wherein the hydrocarbon is benzene.

15. A method according to claim 9, wherein the electron-donating compound is ammonia.

16. Glass coated with a silicon-containing coating according to the method of claim 1, wherein the silicon-containing coating has a refractive index in the range 2.5 to 3.5, and has an alkali-resistance such that it shows no sign of damage to the unaided eye after immersion in 1 Normal sodium hydroxide at 90° C. for at least 60 seconds.

17. Glass according to claim 16, wherein the coating is such that 30% of the light from a C.I.E. Illuminant C source incident on the coated side of the glass is reflected.

18. Glass according to claim 16 wherein the refractive index of the coating is in the range 2.8 to 3.4.

19. Glass according to claim 16, wherein the glass is soda-lime-silica glass.

* * * * *